United States Patent
Miura

(10) Patent No.: US 6,606,712 B1
(45) Date of Patent: Aug. 12, 2003

(54) ELECTRONIC DEVICE AND POWER SOURCE CONTROL METHOD

(75) Inventor: Hiroyasu Miura, Fukaya (JP)

(73) Assignee: Kabushiki Kaisha Toshiba, Kawasaki (JP)

(*) Notice: Subject to any disclaimer, the term of this patent is extended or adjusted under 35 U.S.C. 154(b) by 0 days.

(21) Appl. No.: 09/492,325

(22) Filed: Jan. 27, 2000

(30) Foreign Application Priority Data

Feb. 17, 1999 (JP) ............................................. 11-038569

(51) Int. Cl.[7] ............................. G06F 1/26; G06F 13/00
(52) U.S. Cl. ...................... 713/320; 713/300; 710/100
(58) Field of Search ................................ 713/320, 300; 710/100

(56) References Cited

U.S. PATENT DOCUMENTS

| | | | | |
|---|---|---|---|---|
| 5,307,318 A | * | 4/1994 | Nemoto | 365/226 |
| 5,394,556 A | | 2/1995 | Oprescu | |
| 5,790,876 A | * | 8/1998 | Shima et al. | 396/205 |
| 6,125,448 A | * | 9/2000 | Schwan et al. | 713/300 |
| 6,131,167 A | * | 10/2000 | Cruz | 713/300 |

* cited by examiner

*Primary Examiner*—Thomas Lee
*Assistant Examiner*—Suresh K Suryawanshi
(74) *Attorney, Agent, or Firm*—Finnegan, Henderson, Farabow, Garrett & Dunner, L.L.P.

(57) ABSTRACT

When power-off is instructed, a 1394 bus power source management section reads the value of a register of a link layer control unit circuit, and checks if a network device acts as a data transmission mediator. When the device does not act as a data transmission mediator, the 1394 bus power source management section instructs a power source control section to turn off power, including power applied to the link layer control circuit and physical layer control circuit. When the device acts as a data transmission mediator, the 1394 bus power source management section instructs the power source control section to turn off power while keeping power applied to the link layer control circuit and physical layer control circuit. At the same time, the 1394 bus power source management section instructs a power source control circuit to turn off only power applied to the link layer control circuit.

14 Claims, 6 Drawing Sheets

ELECTRONIC DEVICE AND POWER SOURCE CONTROL METHOD

BACKGROUND OF THE INVENTION

The present invention relates to an electronic device such as a personal computer or digital audio-visual device (AV device) having a data transmission function using an IEEE 1394 bus, and a power source control method therefor.

An IEEE 1394 bus (IEEE Std 1394-1995, Standard for a High Performance Serial Bus) is a serial bus used in, e.g., exchanging digital data between a plurality of digital devices or forming a network for allowing a plurality of digital devices to control each other.

Serial buses include a USB bus (Universal Serial Bus) in addition to the IEEE 1394 bus. While the maximum data transfer rate of the IEEE 1394 bus is 400 Mbps, that of the USB bus is as low as 12 Mbps. Thus, the USB bus is not suitable for a transmission medium for video data of a large information amount. At present, therefore, the IEEE 1394 bus is generally used to form an AV device network.

The network formed by the IEEE 1394 bus has a branch structure in which a given digital device may mediate data transmission between two other digital devices. For this reason, even when the given digital device is no longer used, all the functions of this digital device cannot be stopped.

If, however, the power source of the digital device in such state is erroneously turned off, power applied to a protocol layer formed to control data transmission using the IEEE 1394 bus is entirely stopped. That is, data transmission between the two other digital devices via the given digital device is interrupted and cannot be restored.

BRIEF SUMMARY OF THE INVENTION

The present invention has been made in consideration of the above situation, and has as its object to provide an electronic device for preventing interruption of data transmission between other electronic devices owing to user's carelessness, and a power source control method therefor.

To achieve the above object, according to the present invention, power applied to a protocol layer formed to control data transmission using an IEEE 1394 bus is controlled independently of a physical layer and other layers. When power-off of a device is instructed, the connection arrangement of a device on a network formed by the IEEE 1394 bus is determined to determine from the determination result whether the device acts as a role of mediation in data transmission between other devices.

When the device is determined to act as a role of mediation in data transmission, power applied to the protocol layer except the physical layer is turned off. When the device is not determined to act as a role of mediation in data transmission, power applied to the protocol layer including the physical layer is turned off.

Even if the power source of the device is erroneously turned off, the device can mediate data transmission between other devices so long as power can be kept applied to the physical layer.

For this reason, in the present invention, when data transmission between other devices is free from any interruption, power applied the protocol layer including the physical layer is turned off. When data transmission between other devices may be interrupted, power applied to the protocol layer except the physical layer is turned off.

In other words, the present invention realizes more appropriate power source control which does not influence data transmission between other devices.

According to the present invention, power applied to the protocol layer formed to control data transmission using the IEEE 1394 bus is controlled independently of the physical layer and other layers. When power-off of the device is instructed, whether to turn off power applied to the physical layer of the protocol layer is inquired. If power-off of the physical layer is instructed in accordance with the inquiry, power applied to the protocol layer including the physical layer is turned off. If keeping power applied to the physical layer is instructed, power applied to the protocol layer except the physical layer is turned off.

In the present invention, when the power source of the device is turned off, it is asked whether to turn off/keep power applied to the physical layer which can mediate data transmission between other devices. This can prevent interruption of data transmission between other devices owing to user's carelessness.

Moreover, the present invention adopts a back-up battery for applying power to the physical layer of the protocol layer formed to control data transmission using the IEEE 1394 bus while the device is OFF.

According to the present invention, a user can turn off an electronic device regardless of whether or not the electronic device acts as a role of mediation in data transmission between other devices.

According to the first aspect of the present invention, there is provided an electronic device having a data transmission function using a network bus, comprising a power source control circuit for controlling, independently of a physical layer and other layers, power applied to a protocol layer for controlling data transmission using the network bus, a determination section for determining a connection arrangement of the device on a network formed by the network bus, and a power source management section for, when power-off of a device is instructed, determining from a determination result of the determination section whether the device acts as a role of mediation in data transmission between other devices, when the device is determined to act as a role of mediation in data transmission, causing the power source control circuit to turn off power applied to the protocol layer except the physical layer, and when the device is determined not to act as a role of mediation in data transmission, causing the power source control circuit to turn off power applied to the protocol layer including the physical layer.

According to the second aspect of the present invention, there is provided an electronic device having a data transmission function using a network bus, comprising a power source control circuit for controlling, independently of a physical layer and other layers, power applied to a protocol layer for controlling data transmission using the network bus, a user interface section for, when power-off of a device is instructed, inquiring whether to turn off power applied to the physical layer of the protocol layer, and a power source management section for, when power-off of the physical layer is instructed in accordance with the inquiry from the user interface section, causing the power source control circuit to turn off power applied to the protocol layer including the physical layer, and when keeping power applied to the physical layer is instructed, causing the power source control circuit to turn off power applied to the protocol layer except the physical layer.

According to the third aspect of the present invention, there is provided an electronic device having a data transmission function using a network bus, comprising a power source control circuit for controlling, independently of a physical layer and other layers, power applied to a protocol layer for controlling data transmission using the network bus, a determination section for determining a connection arrangement of the device on a network formed by the network bus, a user interface section for inquiring whether to turn off power applied to the physical layer of the protocol layer, a first power source management section for, when power-off of a device is instructed, determining from a determination result of the determination section whether the device acts as a role of mediation in data transmission between other devices, when the device is determined not to act as a role of mediation in data transmission, causing the power source control circuit to turn off power applied to the protocol layer including the physical layer, and when the device is determined to act as a role of mediation in data transmission, causing the user interface section to inquire whether to turn off power applied to the physical layer of the protocol layer, and a second power source management section for, when power-off of the physical layer is instructed in accordance with the inquiry from the user interface section, causing the power source control circuit to turn off power applied to the protocol layer including the physical layer, and when keeping power applied to the physical layer is instructed, causing the power source control circuit to turn off power applied to the protocol layer except the physical layer.

According to the fourth aspect of the present invention, there is provided an electronic device having a data transmission function using a network bus, comprising a control circuit for, when power-off is instructed, turning off power applied to a physical layer of a protocol layer for controlling data transmission using the network bus, and a back-up power source for applying power to the physical layer when the control circuit turns off power applied to the physical layer.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

Preferred embodiments of the present invention will be described below with reference to the several views of the accompanying drawing.

Figure 1:
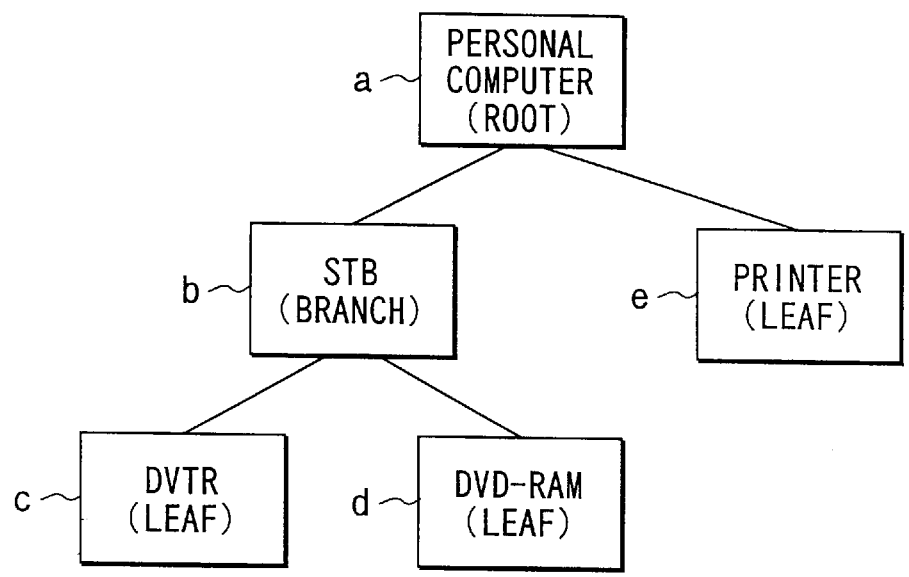
FIG. 1 is a view showing a network formed by an IEEE 1394 bus.

FIG. 1 shows an example of a network formed by an IEEE 1394 bus. In FIG. 1, reference symbol a denotes a personal computer; b, a set-top box (STB); c, a digital video tape recorder (DVTR); d, a DVD-RAM; and e, a printer. All these devices are electronic devices having a data transmission function using an IEEE 1394 bus.

Referring to these devices as node names, c, d, and e are referred to as leaves at distal ends of a tree; b, as a branch; and a, as a root. This structure is generally called a branch type structure in which control instructions and data can be transmitted from each other, e.g., from c to b or from a to c (device connection a-b-c is daisy-chain connection).

In this example, the set-top box b acts as a role of mediation in data transmission between the personal computer a, digital video tape recorder c, and DVD-RAM d. In turning off the power source of the set-top box b, data transmission between the personal computer a, digital video tape recorder c, and DVD-RAM d must be considered. The present invention gives attention to this, and realizes more appropriate power source control which does not influence data transmission between other devices even when a device acts as a role of mediation in data transmission. This will be described in detail below.

(First Embodiment)

Figure 2:
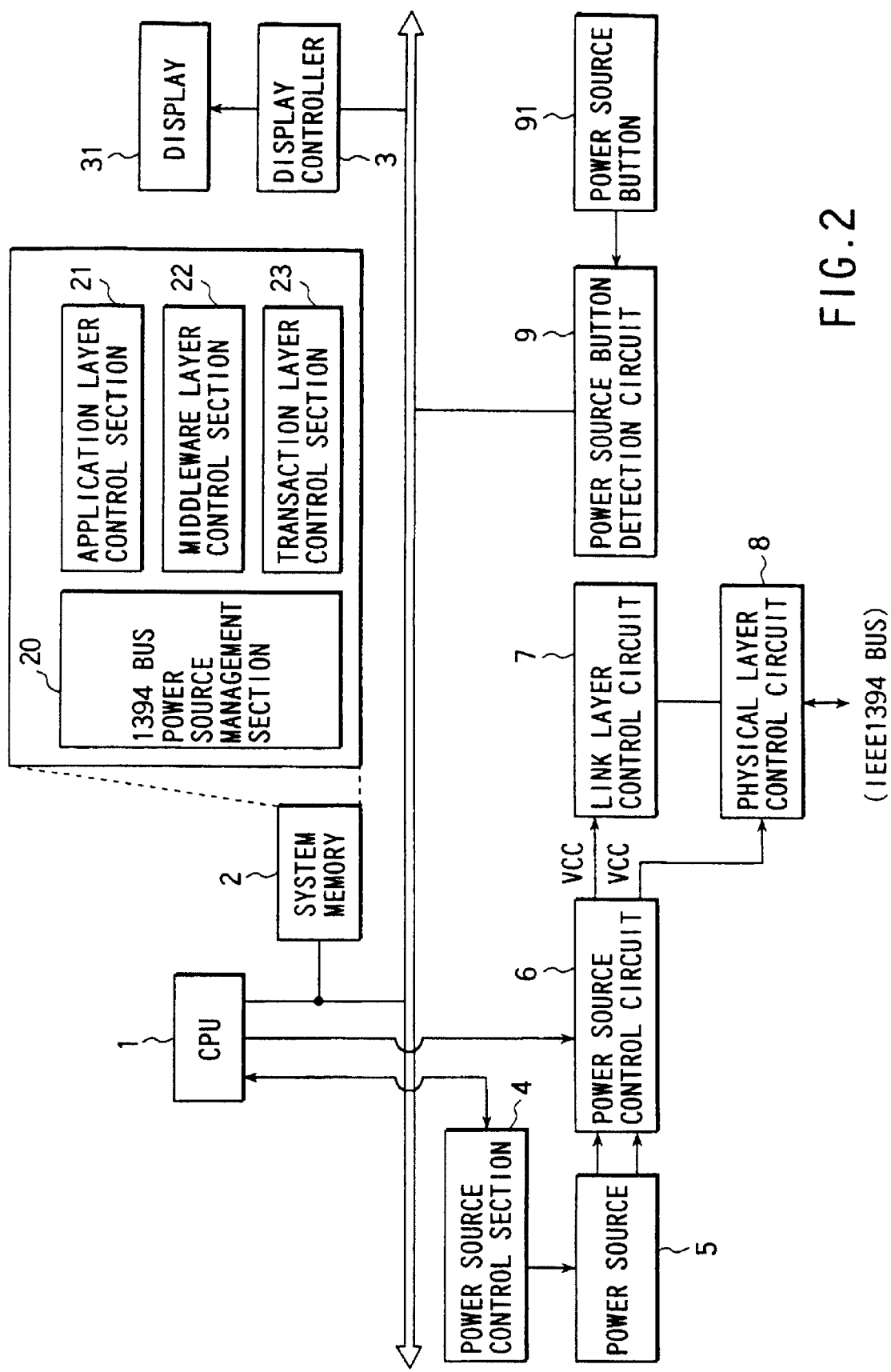
FIG. 2 is a block diagram showing an electronic device according to the first embodiment of the present invention.

The first embodiment of the present invention will be explained. FIG. 2 is a block diagram showing the device arrangement of an electronic device according to the first embodiment. As shown in FIG. 2, the electronic device of the first embodiment comprises a CPU 1, system memory 2, display controller 3, power source control section 4, power source 5, power source control circuit 6, link layer control circuit 7, physical layer control circuit 8, and power source button detection circuit 9.

The CPU 1 controls the whole electronic device, and executes and controls various control programs stored in the system memory 2.

The system memory 2 stores various control programs executed and controlled by the CPU 1, and various data used in executing these control programs. The control programs which are stored in the system memory 2, and executed by and controlled by the CPU 1 include a 1394 bus power source management section 20, application layer control section 21, middleware layer control section 22, and transaction layer control section 23.

The 1394 bus power source management section 20 is a program for managing power applied to a protocol layer formed to control data transmission using an IEEE 1394 bus. This protocol layer is schematically formed from five layers, i.e., a physical layer, link layer, transaction layer, middleware layer, and application layer from the bottom. In this electronic device, the three, application, middleware, and transaction layers are software-controlled by the application layer control section 21, middleware layer control section 22, and transaction layer control section 23. The remaining two physical and link layers are hardware-controlled by the link layer control circuit 7 and physical layer control circuit 8 (to be described below).

The display controller 3 is a device for controlling the output of a user interface in the electronic device, and controls a display 31 such as an LCD or CRT.

The power source control section 4 is a device for controlling driving of the power source 5 to manage power for operating the electronic device. The power source 5 is a device for applying power to the whole electronic device under the control of the power source control section. The power source control circuit 6 is a device for applying/stopping power from the power source 5 to the link layer control circuit 7 and physical layer control circuit 8.

The link layer control circuit 7 is a circuit for controlling the link layer of the protocol layer formed to control data transmission using the IEEE 1394 bus. The physical layer control circuit 8 is a circuit for controlling the physical layer of the protocol layer.

The power source button detection circuit 9 is a device for controlling the input of the user interface in the electronic device. The power source button detection circuit 9 detects that the user presses a power source button 91, and informs the CPU 1 of this.

Figure 3:
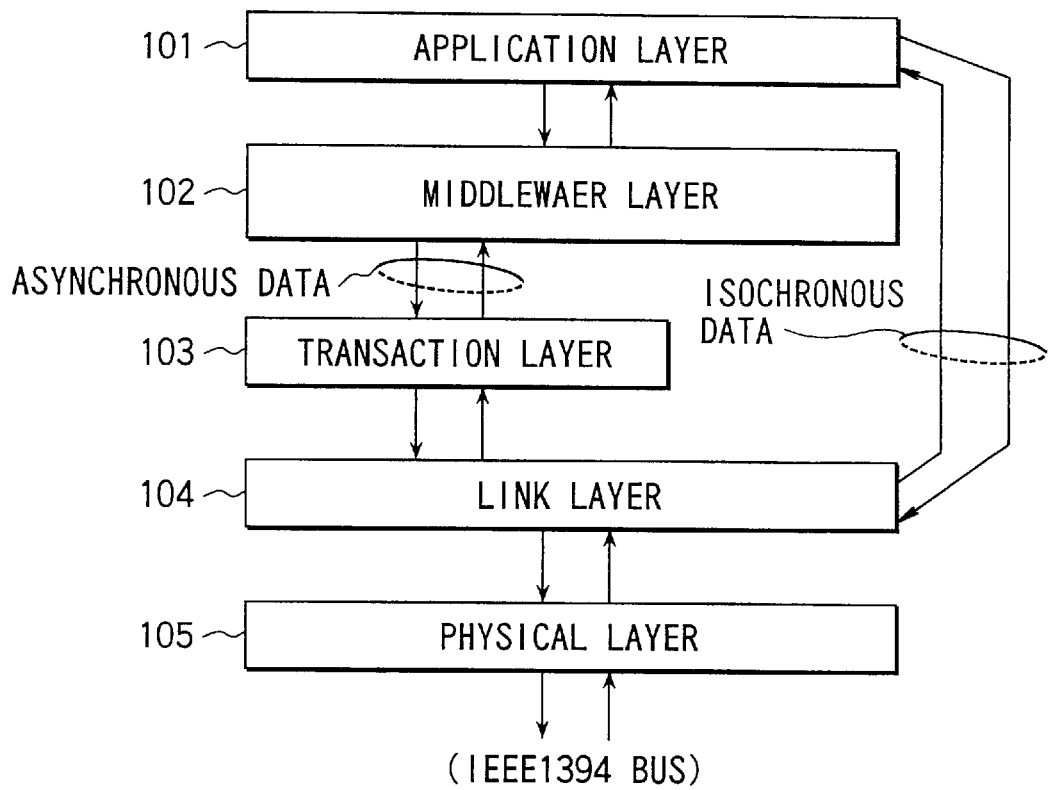
FIG. 3 is a view showing a data flow in an IEEE 1394 protocol layer when a device executes data transmission.
Figure 4:
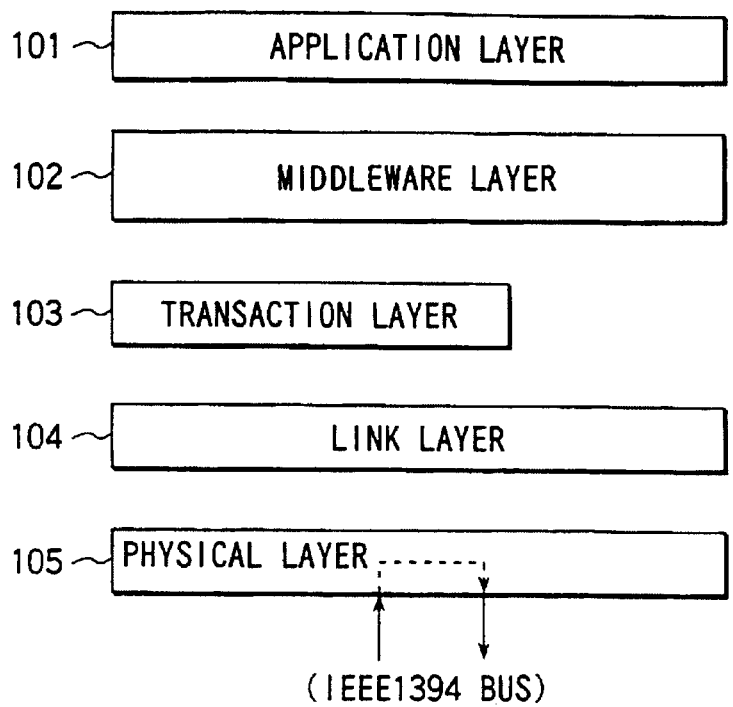
FIG. 4 is a view showing a data flow in the IEEE 1394 protocol layer when the device mediates data transmission between other devices.

FIGS. 3 and 4 are views each showing a transmission data flow in the IEEE 1394 protocol layer. FIG. 3 is a view showing a data flow when a device executes data transmission, and FIG. 4 is a view showing a data flow when the device mediates data transmission between other devices.

As shown in FIGS. 3 and 4, the IEEE 1394 protocol layer is formed from five layers, i.e., an application layer 101, middleware layer 102, transaction layer 103, link layer 104, and physical layer 105. The lowermost physical layer 105 is a layer for controlling a physical/electrical interface with the IEEE 1394 bus, and performs automatic recognition of node connection and bus access arbitration between nodes on the bus. As is apparent from FIG. 4, data transmission between devices can be mediated so long as only the physical layer 105 effectively functions.

The link layer 104 is a layer for controlling addressing, data check, packet transmission/reception (a corresponding device does not mediate but transmits/receives data), cycle control of isochronous transfer. The transaction layer 103 is a layer for controlling asynchronous data processing.

When power-off of the device is instructed by pressing the power source button detection circuit 9, the 1394 bus power source management section 20 controls power applied to the protocol layer including the physical layer 105 as follows in order to prevent interruption of data transmission between other electronic devices owing to user's carelessness.

Figure 5:
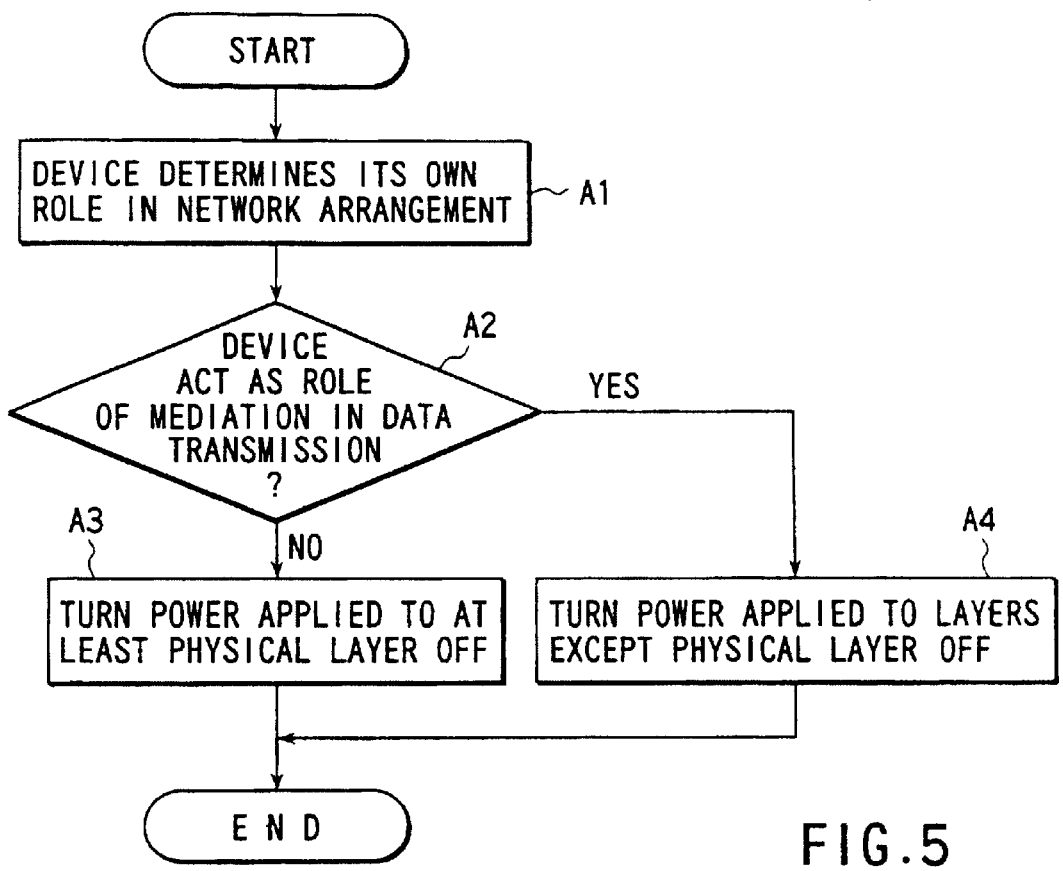
FIG. 5 is a flow chart showing the operation sequence of controlling power applied to the IEEE 1394 protocol layer of the electronic device according to the first embodiment.

FIG. 5 is a flow chart showing the operation sequence of controlling power applied to the IEEE 1394 protocol layer of the electronic device.

If power-off of the device is instructed by pressing the power source button 91, the power source button detection circuit 9 informs the CPU 1 of this, and a power-off instruction is transmitted to the 1394 bus power source management section 20. The 1394 bus power source management section 20 having received the power-off instruction determines the role of its own device in the network arrangement, i.e., a connection arrangement (step A1). More specifically, the 1394 bus power source management section 20 checks whether the device functions as a root, branch, or leaf on the network. Note that the connection arrangement of the device is recognized by a 1394 bus management section (not shown) for managing the IEEE 1394 bus. The 1394 bus power source management section 20 asks the 1394 bus management section about the role of the device.

The 1394 bus power source management section 20 determines from the determination result of the role of the device in the network arrangement whether or not the device acts as a role of mediation in data transmission (step A2). This determination is executed depending on whether the device is a leaf (not act as any role of mediation in data transmission) or is not a leaf (acts as a role of mediation in data transmission).

If the device is determined not to act as any role of mediation (NO in step A2), the 1394 bus power source management section 20 instructs the power source control section 4 to turn off power including power applied to the link layer control circuit 7 and physical layer control circuit 8. Then, the power source control section 4 turns power applied to at least the physical layer off (step A3). If the device is determined to act as a role of mediation (YES in step A2), the 1394 bus power source management section 20 instructs the power source control section 4 to turn off power while keeping power applied to the link layer control circuit 7 and physical layer control circuit 8. At the same time, the 1394 bus power source management section 20 instructs the power source control circuit 6 to turn off only power applied to the link layer control circuit 7. Then, the power source control circuit 6 turns power applied to layers except the physical layer off (step A4).

More specifically, in the electronic device of the first embodiment, when power-off of the device is instructed, whether to turn off/keep power applied to the physical layer is controlled depending on whether or not the device acts as a role of mediation in data transmission. This can realize more appropriate power source control which does not influence data transmission between other devices.

Note that, for example, when the 1394 bus management section for managing the IEEE 1394 bus, and transaction layer control section 23 are constructed in the same firmware, the 1394 bus power source management section 20 for executing the above-described power source management may be constructed in this firmware.

(Second Embodiment)

Figure 6:
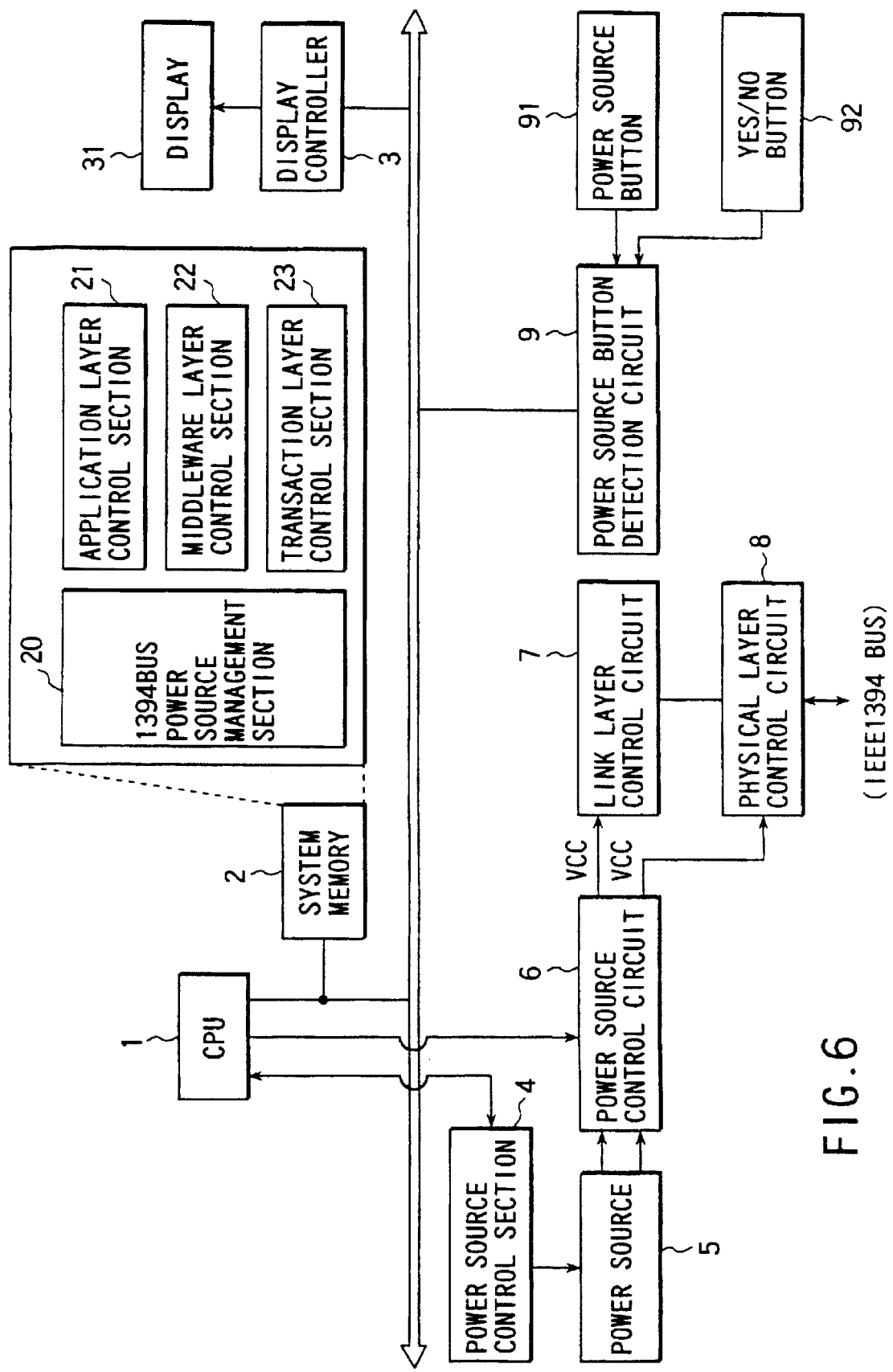
FIG. 6 is a block diagram showing an electronic device according to the second embodiment.

The second embodiment of the present invention will be explained. FIG. 6 is a block diagram showing the device arrangement of an electronic device according to the second embodiment. The electronic device of the second embodiment is different in device arrangement from the electronic device of the first embodiment in that a YES/NO button 92 is newly added, and a power source button detection circuit 9 detects pressing of the YES/NO button 92 in addition to pressing of a power source button 91. A 1394 bus power source management section 20 of the second embodiment asks a user whether to keep/turn off power applied to a physical layer of a protocol layer, instead of determining the role of a device in the network arrangement.

Figure 7:
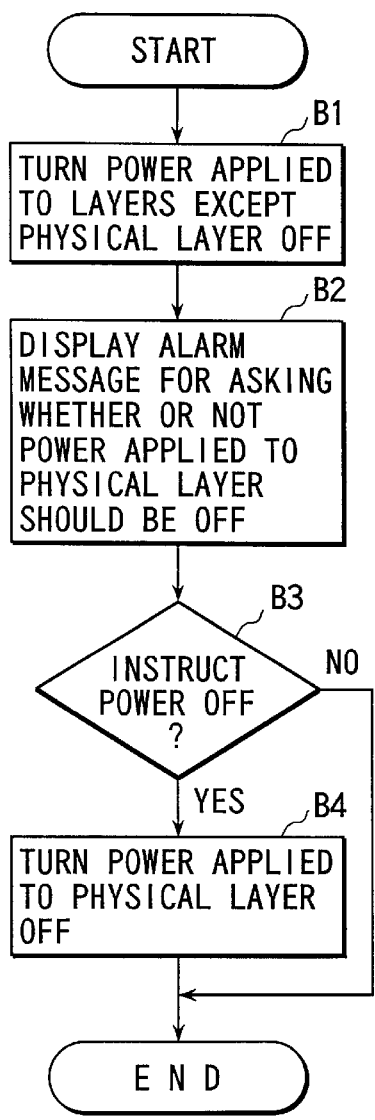
FIG. 7 is a flow chart showing the operation sequence of controlling power applied to the IEEE 1394 protocol layer of the electronic device according to the second embodiment.

FIG. 7 is a flow chart showing the operation sequence of controlling power applied to the IEEE 1394 protocol layer of the electronic device.

If power-off of the device is instructed by pressing the power source button 91, the power source button detection circuit 9 informs a CPU 1 of this, and a power-off instruction is transmitted to the 1394 bus power source management section 20. The 1394 bus power source management section 20 having received the power-off instruction instructs a power source control section 4 to turn off power while keeping power applied to a link layer control circuit 7 and physical layer control circuit 8. At the same time, the 1394 bus power source management section 20 instructs a power source control circuit 6 to turn off only power applied to the link layer control circuit 7. Then, the power source control circuit 6 turns power applied to layers except the physical layer off (step B1).

The 1394 bus power source management section 20 displays on a display 31 an alarm message for asking whether to keep/turn off power applied to the physical layer, such as "does this device mediate data transmission between other devices? (YES/NO)" (step B2).

If power-off of the physical layer is instructed by pressing the YES/NO button 92 in response to this message (YES in step B3), the 1394 bus power source management section 20 instructs the power source control section 4 to turn off power including power applied to the link layer control circuit 7 and physical layer control circuit 8. Then, the power source control section 4 turns power applied to the physical layer off (step B4).

More specifically, in the electronic device of the second embodiment, whether to turn off/keep power applied to the physical layer is asked when power-off of the device is instructed. This can prevent interruption of data transmission between other devices owing to user's carelessness.

Figure 8:
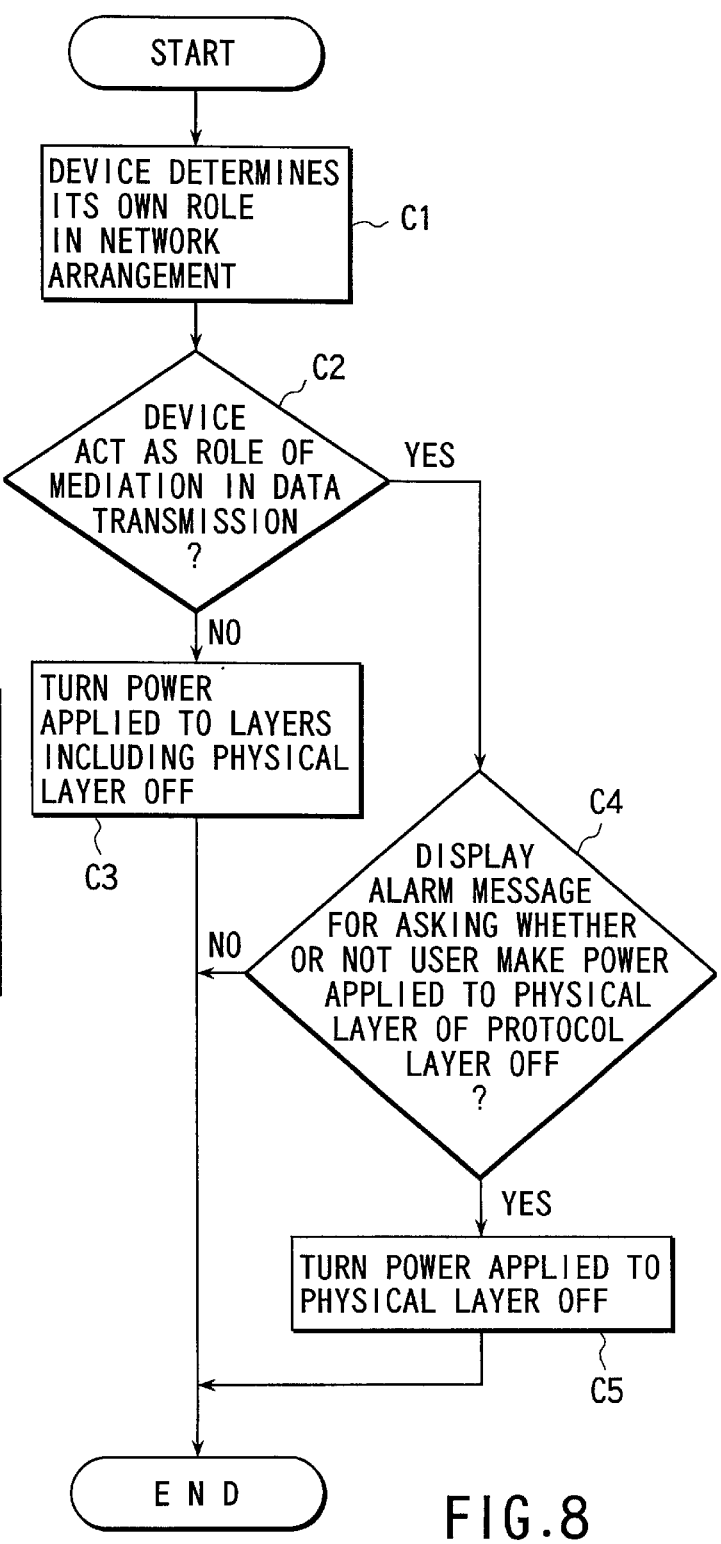
FIG. 8 is a flow chart showing a modification of power application control in the electronic device according to the second embodiment.

The following steps as shown in the flow chart of FIG. 8 are also effective. As described in the first embodiment, the 1394 bus power source management section 20 determines whether or not its own device acts as a role of mediation in data transmission (C1 and C2). If the device is not determined to act as any role of mediation, the 1394 bus power source management section 20 unconditionally turns power applied to layers including the physical layer off (step C3). If the device is determined to act as a role of mediation, the 1394 bus power source management section 20 asks whether to turn off/keep power applied to the physical layer (C4). Also in this case, even if the device acts as a role of mediation in data transmission, power applied to the physical layer is turned off depending on a user's instruction (C5).

(Third Embodiment)

Figure 9:
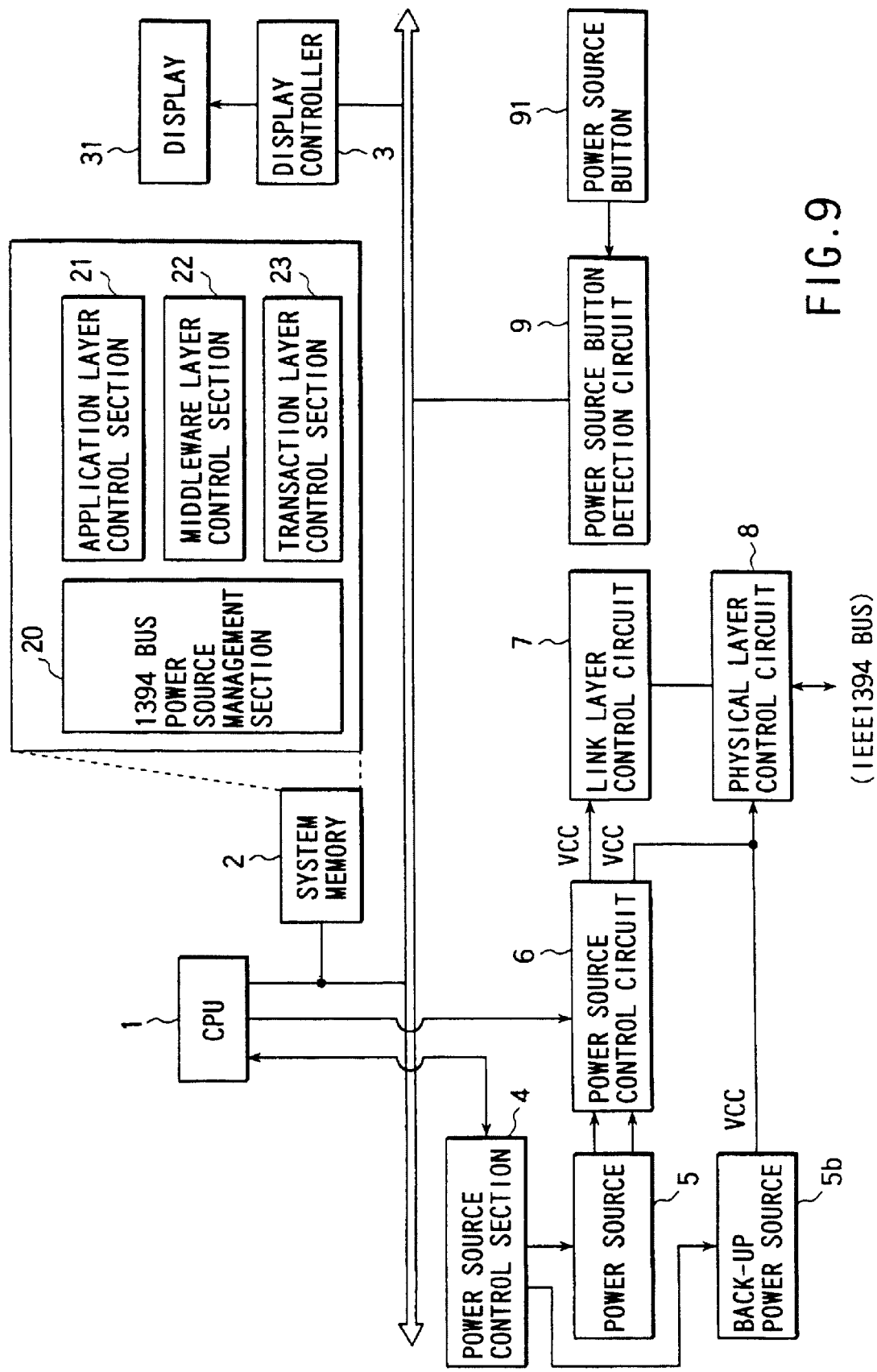
FIG. 9 is a block diagram showing an electronic device according to the third embodiment.

The third embodiment of the present invention will be explained. FIG. 9 is a block diagram showing the device arrangement of an electronic device according to the third embodiment. The electronic device of the third embodiment is different in device arrangement from the electronic device of the first embodiment in that the former electronic device newly comprises a back-up power source 5b for applying power to a physical layer control circuit 8 while the device is OFF. When power-off of the device is instructed, a 1394 bus power source management section 20 of the third embodiment instructs a power source control section 4 to turn off power applied from a power source 5 to a link layer control circuit 7 and physical layer control circuit 8 and to start applying power from the back-up power source 5b to the physical layer control circuit 8.

The electronic device of the third embodiment can make a user turn off the electronic device regardless of whether or not the electronic device acts as a role of mediation in data transmission between other devices.

Similar to the first embodiment, when a 1394 bus management section for managing the IEEE 1394 bus, and transaction layer control section 23 are constructed in the same firmware, the 1394 bus power source management section 20 for executing the above-described power source management may be constructed in this firmware.

In the third embodiment, the presence/absence of power applied to the physical layer is determined by a device to be turned off. However, the present invention is not limited to this. Alternatively, a device serving as a root may determine whether a device to be turned off acts as a branch or leaf. If the device to be turned off is determined to act as a branch, the root device may instruct the branch device to execute processing described in each of the first to third embodiments.

In this case, the device having received the instruction from the root device executes processing (e.g., A2 to A4 shown in FIG. 5, B1 to B4 shown in FIG. 7, or C4 and C5 shown in FIG. 8) described in each of the first to third embodiments.

As has been described in detail, according to the present invention, (a) when power-off of the device is instructed, whether to turn off/keep power applied to the physical layer is controlled depending on whether or not the device acts as a role of mediation in data transmission between other devices. (b) When power-off of the device is instructed, whether to turn off/keep power applied to the physical layer is asked.

Alternatively, (c) a back-up power source for applying power to the physical layer while the device is OFF is newly added. (a) More appropriate power source control which does not influence data transmission between other devices can be realized. (b) Interruption of data transmission between other devices owing to user's carelessness can be prevented. (c) A user can turn off the electronic device regardless of whether or not the electronic device acts as a role of mediation in data transmission between other devices.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An electronic device having a data transmission function using a network bus, comprising:

a power source control circuit for controlling, independently of a physical layer and other layers, power applied to a protocol layer for controlling data transmission using the network bus;

a determination section for determining a connection arrangement of said device on a network formed by the network bus; and a power source management section for, when power-off of a device is instructed, determining from a determination result of said determination section whether said device acts as a role of mediation in data transmission between other devices, when said device is determined to act as a role of mediation in data transmission, causing said power source control circuit to turn off power applied to the protocol layer except the physical layer, and when said device is determined not to act as a role of mediation in data transmission, causing said power source control circuit to turn off power applied to the protocol layer including the physical layer.

2. A device according to claim 1, wherein said power source management section is realized by firmware together with a network bus management section for managing the network bus.

3. A device according to claim 1, wherein the network bus comprises an IEEE 1394 bus.

4. An electronic device having a data transmission function using a network bus, comprising:
   a power source control circuit for controlling, independently of a physical layer and other layers, power applied to a protocol layer for controlling data transmission using the network bus;
   a user interface section for, when power-off of a device is instructed, inquiring whether to turn off power applied to the physical layer of the protocol layer; and
   a power source management section for, when power-off of the physical layer is instructed in accordance with the inquiry from said user interface section, causing said power source control circuit to turn off power applied to the protocol layer including the physical layer, and when keeping power applied to the physical layer is instructed, causing said power source control circuit to turn off power applied to the protocol layer except the physical layer.

5. A device according to claim 4, wherein said power source management section is realized by firmware together with a network bus management section for managing the network bus.

6. A device according to claim 4, wherein the network bus comprises an IEEE 1394 bus.

7. An electronic device having a data transmission function using a network bus, comprising:
   a power source control circuit for controlling, independently of a physical layer and other layers, power applied to a protocol layer for controlling data transmission using the network bus;
   a determination section for determining a connection arrangement of said device on a network formed by the network bus;
   a user interface section for inquiring whether to turn off power applied to the physical layer of the protocol layer;
   a first power source management section for, when power-off of a device is instructed, determining from a determination result of said determination section whether said device acts as a role of mediation in data transmission between other devices, when said device is determined not to act as a role of mediation in data transmission, causing said power source control circuit to turn off power applied to the protocol layer including the physical layer, and when said device is determined to act as a role of mediation in data transmission, causing said user interface section to inquire whether to turn off power applied to the physical layer of the protocol layer; and
   a second power source management section for, when power-off of the physical layer is instructed in accordance with the inquiry from said user interface section, causing said power source control circuit to turn off power applied to the protocol layer including the physical layer, and when keeping power applied to the physical layer is instructed, causing said power source control circuit to turn off power applied to the protocol layer except the physical layer.

8. A device according to claim 7, wherein the network bus comprises an IEEE 1394 bus.

9. An electronic device having a data transmission function using a network bus, comprising:
   a control circuit for, when power-off is instructed, turning off power applied to a physical layer of a protocol layer for controlling data transmission using the network bus; and
   a back-up power source for applying power to the physical layer when said control circuit turns off power applied to the physical layer when said device is determined to act as a role of mediation in data transmission.

10. A power source control method for an electronic device having a data transmission function using a network bus, comprising:
    determining a connection arrangement of the device on a network formed by the network bus when power-off of the device is instructed;
    determining from a determination result whether the device acts as a role of mediation in data transmission between other devices; and
    when the device is determined to act as a role of mediation in data transmission, turning off power applied to a protocol layer except a physical layer of the protocol layer formed to control data transmission using the network bus, and when the device is determined not to act as a role of mediation in data transmission, turning off power applied to the protocol layer including the physical layer.

11. A power source control method for an electronic device having a data transmission function using a network bus, comprising:
    when power-off of the device is instructed, inquiring of a user whether to turn off power applied to a physical layer of a protocol layer formed to control data transmission using the network bus; and
    when power-off of the physical layer is instructed in accordance with the inquiry, turning off power applied to the protocol layer including the physical layer, and when keeping power applied to the physical layer is instructed, turning off power applied to the protocol layer except the physical layer.

12. A control method for an electronic device having a data transmission function using a network bus, comprising:
    determining a connection arrangement of the device on a network formed by the network bus;
    when power-off of the device is instructed, determining from a determination result whether the device acts as a role of mediation in data transmission between other devices, when the device is determined not to act as a role of mediation in data transmission, turning off power applied to a protocol layer including a physical layer, and when the device is determined to act as a role of mediation in data transmission, inquiring whether to turn off power applied to the physical layer of the protocol layer; and
    when power-off of the physical layer is instructed in accordance with the inquiry, turning off power applied to the protocol layer including the physical layer, and when keeping power applied to the physical layer is instructed, turning off power applied to the protocol layer except the physical layer.

13. A control method for an electronic device having a data transmission function using a network bus, comprising:

when power-off is instructed, turning off power applied to a physical layer of a protocol layer for controlling data transmission using the network bus; and applying power from a back-up power source to the physical layer when a control circuit turns off power applied to the physical layer when said device is determined to act as a role of mediation in data transmission.

14. An electronic device for transmitting data over a network bus comprising:

a power source control circuit to control, independently of a physical layer and other layers, power applied to a protocol layer for controlling data transmitted over the network bus; and a power source management section that causes the power source control circuit to turn off power applied to the protocol layer, except the physical layer, when the device act s as a data transmission mediator.

* * * * *

UNITED STATES PATENT AND TRADEMARK OFFICE
CERTIFICATE OF CORRECTION

PATENT NO. : 6,606,712 B1
DATED : August 12, 2003
INVENTOR(S) : Miura

It is certified that error appears in the above-identified patent and that said Letters Patent is hereby corrected as shown below:

<u>Title page, Item [54] and Column 1, lines 1 and 2,</u>
Delete "ELECTRONIC DEVICE AND POWER SOURCE CONTROL METHOD" and insert therefor -- SYSTEM FOR TURNING OFF POWER APPLIED TO PROTOCOL LAYER EXCEPT PHYSICAL LAYER UPON DETERMINATION THAT THE DEVICE IS USED IN DATA TRANSMISSION BETWEEN OTHER DEVICES --.

<u>Title page,</u>
Item [56], below "*cited by the examiner" insert the following:
--                   OTHER PUBLICATIONS
IEEE Std. 1394-1995; "IEEE Standard for a High Performance Serial Bus," published by the Institute of Electrical and Electronics Engineers, Inc., N.Y., N.Y., for IEEE Computer Society, pp. 1-372 (August 1996). --.

Signed and Sealed this

Twenty-seventh Day of January, 2004

JON W. DUDAS
*Acting Director of the United States Patent and Trademark Office*